United States Patent [19]

Kennedy

[11] Patent Number: 4,938,328

[45] Date of Patent: Jul. 3, 1990

[54] FLOATING WIPER FOR A PUMP PLATE OF A VISCOUS FLUID CLUTCH

[75] Inventor: Lawrence C. Kennedy, Kettering, Ohio

[73] Assignee: General Motors Corporation, Detroit, Mich.

[21] Appl. No.: 404,538

[22] Filed: Sep. 8, 1989

[51] Int. Cl.$^5$ ............................................. F16D 35/02
[52] U.S. Cl. .................................................. 192/58 B
[58] Field of Search ............................ 192/58 B, 82 T

[56] References Cited

U.S. PATENT DOCUMENTS 3,880,265 4/1975 Elmer ................................. 192/58 B
4,269,295 5/1981 Kish .................................... 192/58 B Primary Examiner—Richard Lorence
Attorney, Agent, or Firm—A. Michael Tucker

[57] ABSTRACT

A floating wiper assembly mounted on a pump plate of a viscous fluid clutch includes a spring secured at its first end to a pump plate. A wiper formed from a low-friction material is secured to a second end of the spring and received in an opening in the pump plate. During assembly of the clutch, the wiper is urged by the spring into the pumping chamber and accommodates variances in machining and assembly variances. The wiper projects into a pumping chamber to create a fluid pressure rise to enhance the pump-out through an orifice of fluid in the pumping chamber to the reservoir.

3 Claims, 2 Drawing Sheets

FLOATING WIPER FOR A PUMP PLATE OF A VISCOUS FLUID CLUTCH

BACKGROUND OF THE INVENTION

1. Field of the Invention

The present invention relates generally to a viscous fluid coupling device. In particular, the present invention is concerned with a floating wiper mounted on a pump plate of a viscous fluid fan clutch.

2. Statement of the Related Art

A thermostatically-controlled viscous fluid clutch assembly for driving and rotating a vehicle cooling fan is well-known. A multi-bladed fan is removably secured to a body of the clutch assembly. The fan and clutch assembly are installed between an accessory pulley of a vehicle engine (typically the water pump pulley) and a radiator. The clutch assembly drives the fan at high speeds close to input speed when cooling is required and permits the fan to rotate at low speeds when cooling is not required. Thermostatic control of the fan through the clutch assembly reduces the load on an engine and the noise caused by fan rotation, resulting in horsepower gain and improved fuel economy.

Generally, a clutch assembly includes a clutch plate having lands and grooves mated to the body having complementary lands and grooves. A pump plate separates a pair of internally-contained chambers, a collecting chamber and a pumping chamber, from a reservoir. Gates in the pump plate permit the flow of a viscous fluid from the reservoir to the collecting chamber and into a shear zone between the lands and grooves of the body and clutch plate. Fluid sheared between the lands and grooves transfers input torque from the clutch plate to drive the body and the attached fan.

Fluid flow through the pump plate gates is controlled by a control arm placed adjacent the pump plate. When cooling is not required, the control arm is rotated so that the gates are covered and the majority of the fluid in the shear zone is pumped into the pumping chamber. Orifices in the pump plate permit passage of the fluid from the pumping chamber into the reservoir. The removal of a majority of the fluid from the shear zone substantially reduces the shear between the clutch plate and the body, thereby substantially reducing the rotation of the fan.

When cooling is required, the control arm is rotated an opposite direction to uncover the gates and permit fluid to flow into the shear zone, thereby increasing the shearing force between the clutch plate and the body. This increase in input torque results in faster rotation of the fan to increase the flow of cooling air.

Oftentimes, a bimetallic element is utilized to actuate the control arm, and thus the flow of fluid through the pump plate gates. The bimetallic element may be connected to a control shaft which is in turn connected to the control arm. As the bimetallic element expands due to the temperature of warm ambient air, the shaft rotates, thereby causing the rotation of the control arm. As the ambient air cools, the bimetallic element contracts, causing the control shaft and the control arm to rotate in an opposite direction.

It is well-known to provide wiper elements on a surface of the pump plate in communication with the pumping chamber. A plurality of wipers project from the pump plate adjacent each pump plate orifice into the pumping chamber. Each wiper can be formed as a thin, flat element secured to the pump plate usually by welding. In other embodiments, a wiper may be integrally formed with the pump plate by stamping a projection in a pump plate adjacent each pump plate orifice. As a fan clutch is rotated, an increase in fluid pressure in the pumping chamber occurs as the wiper creates a fluid dam. The increase in fluid pressure results in increased fluid flow through the pump plate orifices.

Control of machining and assembly tolerances are important to the function of conventional fluid clutch assemblies. A particular area where tolerances must be closely checked and controlled involves the wiper and the pumping chamber. During formation of a pump plate, the height of a stamped or welded wiper must be closely controlled. To maximize the pump-out efficiency of a clutch assembly, it is desirable that the wiper extend as far as possible into the pumping chamber. Of course, the height of a manufactured wiper cannot exceed the allotted design height. Furthermore, the distance between the pump plate and the clutch plate must be controlled so as to provide adequate space for receiving the wipers. The height of wipers and the width of pumping chambers are usually in the range of a few thousandths of an inch. Control of these dimensions adds to the costs of machining and assembly. In order to reduce costs, conventional clutch designs shorten the height of wipers to provide extra space and accommodate machining and assembly variances.

The art continues to seek improvements. It is desirable to provide wipers in a pumping chamber to enhance the pump-out of the chamber. Concurrently, it is desirable to provide a clutch design wherein the machining and assembly costs can be reduced.

SUMMARY OF THE INVENTION

The present invention is directed to a viscous fluid drive device particularly suitable for a fan clutch assembly of a vehicle. The present fan clutch assembly utilizes a floating wiper assembly mounted on a pump plate. The wiper is urged into a pumping chamber and into contact with a clutch plate by a spring. The spring permits the wiper to position itself in a pumping chamber and accommodate variances in the clutch plate assembly. The variability of the wiper permits the machining and the assembly tolerances of a clutch assembly to be increased, thereby reducing the associated costs.

In a preferred embodiment, the invention includes a floating wiper assembly for enhancing the pump-out of fluid from a pumping chamber to a reservoir in a viscous fluid clutch. The wiper assembly includes a spring secured at its first end to a pump plate. A wiper formed from a low-friction material is secured to a second end of the spring and received in an opening in the pump plate. During assembly of the clutch, the wiper is urged by the spring into the pumping chamber and accommodates variances in machining and assembly variances. The wiper projects into a pumping chamber to create a fluid pressure rise to enhance the pump-out through an orifice of fluid in the pumping chamber to the reservoir.

DETAILED DESCRIPTION OF THE PREFERRED EMBODIMENTS

Figure 1:
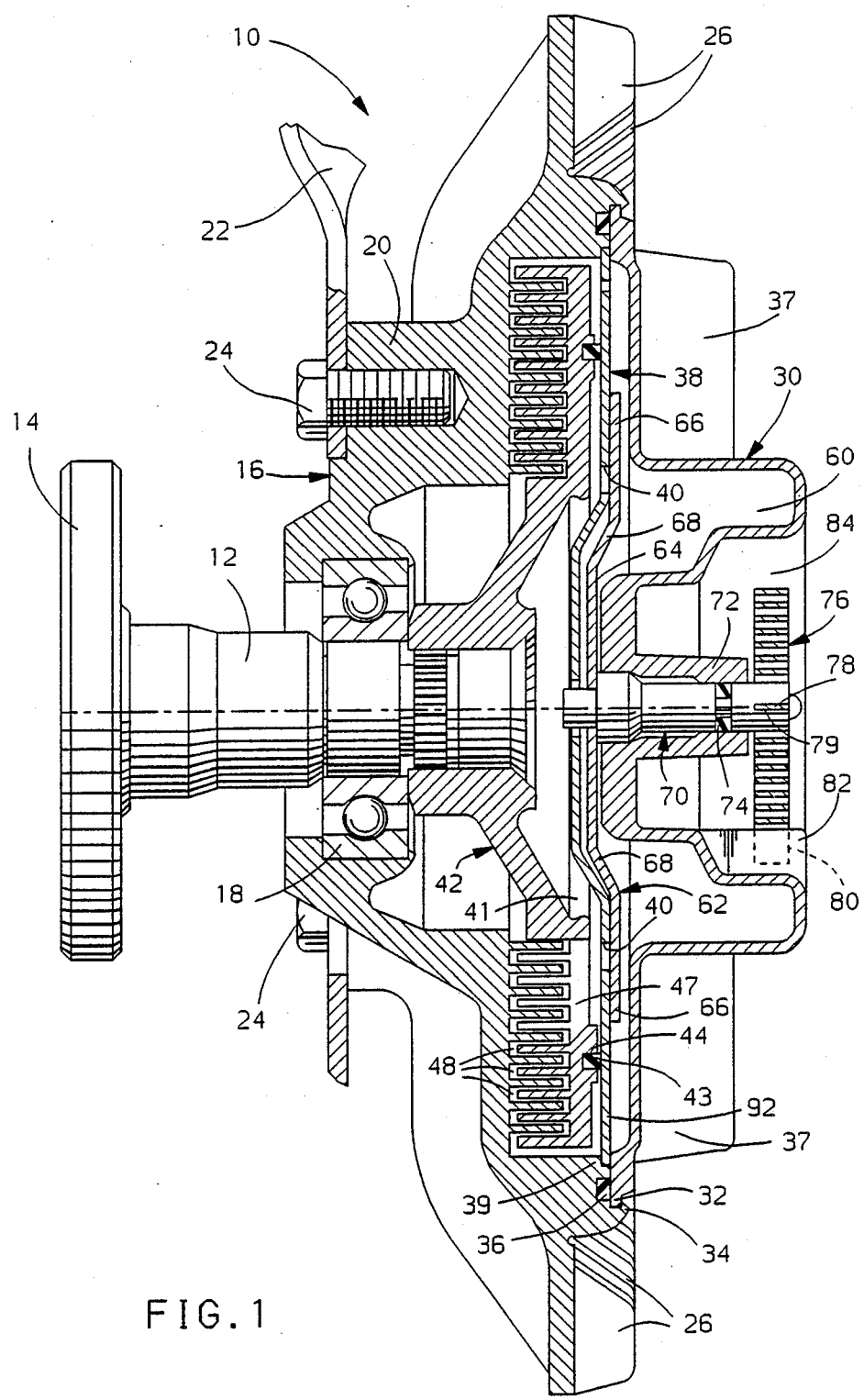
FIG. 1 is a sectional view of a viscous fluid fan clutch and blade assembly.

FIG. 1 illustrates a multi-bladed fan and clutch assembly, indicated generally at 10, for drawing cooling air through the core of a vehicle radiator (not illustrated) through which engine cooling fluid is circulated. The fan and clutch assembly 10 is mounted on the outboard end of a rotatably driven shaft 12 whose inboard end terminates in a flange 14 which can be secured to a conventional engine-driven water pump pulley (not illustrated). The fan and clutch assembly 10 includes a dished main body indicated generally at 16 centrally mounted for rotation on shaft 12 by a bearing 18. The main body 16 is formed with a plurality of radially extending bosses 20 to which a multi-bladed fan 22 (partially illustrated in FIG. 1) is attached by threaded fasteners 24. A plurality of fins 26 is provided on the outer surface of the main body 16 to dissipate heat transferred from a viscous fluid housed by the assembly 10.

A cover plate indicated generally at 30 is mounted to a front face of and cooperates with the main body 16 to form a housing and reservoir as described below. The cover plate 30 is a dished member whose annular outer edge 32 is secured to the main body 16 by an annular retainer lip 34 spun over from the material of the main body 16. An annular seal 36, e.g. a formed-in-place gasket, is interposed between the edge 32 and the front face of the main body 16 to prevent leakage of the fluid from the interior of assembly 10. A plurality of fins 37 is provided on the outer surface of the cover plate 30 to dissipate heat transferred from the fluid.

Disposed behind the cover plate 30 is a disk-like annular pump plate indicated generally at 38 whose diameter is slightly less than that of the cover plate 30. The pump plate 38 is drivingly secured to the main body 16 as it is trapped on an annular shoulder 39 (see FIG. 2) of the main body 16 by the cover plate 30.

The pump plate 38 has a pair of diametrically opposed passages or gates 40 provided in its central portion. When uncovered, gates 40 allow the fluid to flow into a collecting chamber 41 formed and bounded by the pump plate 38, a clutch plate 42 and a divider ring 43. The clutch plate 42 is mounted (preferably splined or knurled) on shaft 12 at a central opening and provides for the hydraulic drive of the main body 16 and attached fan 22 as described below. Ring 43, preferably formed from TEFLON, is mounted in an annular groove 44 in the outer or front face of the clutch plate 42 and improves pump-out or clutch disengagement as described below.

Figure 2:
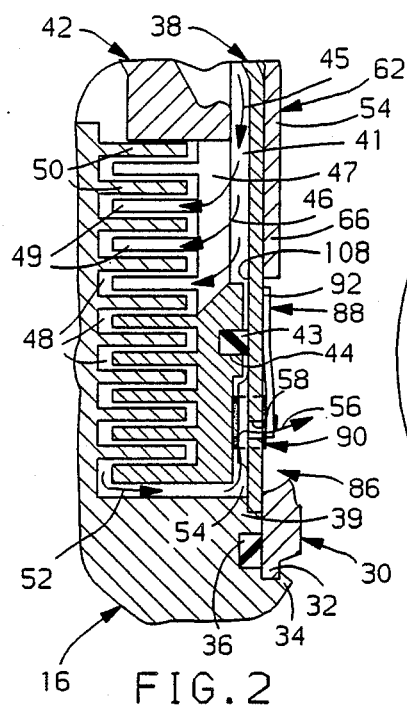
FIG. 2 is an enlarged view of a portion of the clutch assembly of FIG. 1 wherein the pump plate has been rotated to illustrate a floating wiper assembly of the present invention mounted on a pump plate.
Figure 3:
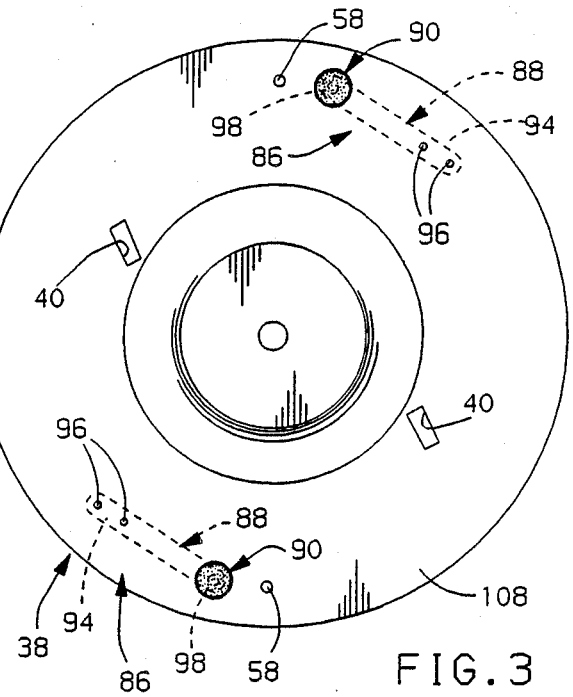
FIG. 3 is a side elevational view of a rear face of the pump plate removed from the clutch assembly of FIGS. 1 and 2 illustrating a spring and a wiper of the present floating wiper assembly mounted on the pump plate.
Figure 4:
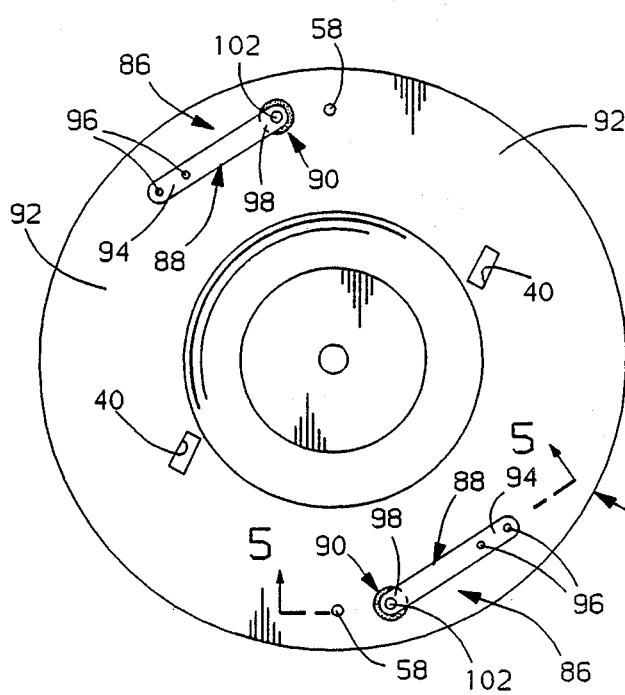
FIG. 4 is a side elevational view of the front face of the pump plate and the present floating wiper assembly of FIG. 3.
Figure 5:
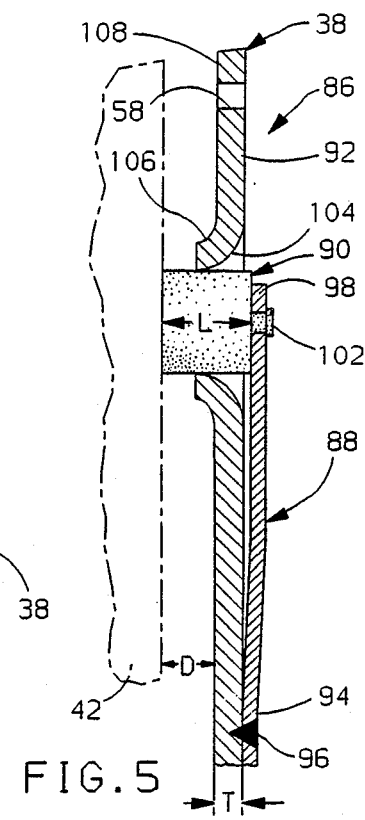
FIG. 5 is a sectional view taken along lines 5—5 of FIG. 4 illustrating the wiper urged against a clutch plate by the spring.

As illustrated in FIG. 2, the centrifugal forces of the rotating assembly 10 force fluid in the collecting chamber 41 to radial fluid flow indicated at directional arrow 45. As fluid 45 reaches the lower portion of the collecting chamber 41, it is redirected to axial fluid flow indicated at directional arrows 46 through well-known passages 47 in the clutch plate 42 into an annular serpentine fluid shear zone 48 formed by the grooves or spaces between interleaved concentric annular ridges or lands 49 formed in a rear face of a clutch plate 42 and complementary concentric annular ridges or lands 50 formed on an interior surface of the main body 16.

Fluid sheared in the shear zone 48 transmits input torque from the rotatably driven clutch plate 42 to provide for the hydraulic drive of the main body 16 and the attached bladed fan 22 for cooling fan operation. Due to slippage between the clutch plate 42 and the main body 16, the fan speed is always less than the input speed from the shaft 12.

Fluid indicated at directional arrow 52 is forced radially outwardly by centrifugal forces and exits the shear zone 48 into a pumping chamber 54 formed and bounded by the pump plate 38, the clutch plate 42 and the divider ring 43.

Fluid indicated at directional arrow 56 travels through a discharge orifice 58 formed in the pump plate 38 back into a fluid reservoir 60 in a manner well-known in this art.

The reservoir 60 formed between the cover plate 30 and the pump plate 38 contains a specified quantity of viscous fluid. The covering and uncovering of the gates 40 to control the supply of the fluid into the collecting chamber 41 is provided by a control arm indicated generally at 62. In the embodiment illustrated, the control arm 62 is a flexible longitudinal dished member having a planar central portion 64 and opposite planar wings 66 connected by a ramp wall 68 to form a profile complementary to the pump plate 38. The control arm 62 is drivingly connected to a control shaft indicated generally at 70 as described below. The control shaft 70 is rotatably mounted in a tubular hub portion 72 formed in the central portion of the cover plate 30. An O-ring seal 74 is mounted in an annular groove in the control shaft 70 and makes peripheral contact with the inner wall of the hub portion 72 to prevent fluid leakage to the exterior of the assembly 10.

A helically-wound bimetallic thermostatic valve control element indicated generally at 76 (FIG. 1) includes an inner end portion 78 mounted in a slot 79 formed in a forward end of the control shaft 70 and an outer end portion 80 mounted in a retaining tab 82 formed in the cover plate 30. Preferably, the valve control element 76 is recessed within a cavity 84 surrounding the hub portion 72. Through this construction, an increase or decrease in ambient air temperature causes the winding or unwinding of the valve control element 76, resulting in rotation of the control shaft 70 and the attached control arm 62. The control arm 62 is illustrated in the closed position in FIG. 1 wherein the wings 66 cover the gates 40. When the valve control element 76 expands due to heat, the control shaft 70 and the control arm 62 rotate in one direction so that the wings 66 uncover the gates 40 in a well-known manner in this art. When the valve control element 76 contracts due to cooling, the control shaft 70 and the control arm 62 rotate the opposite direction so that the wings 66 cover the gates 40.

A pair of floating wiper assemblies 86 are mounted on the pump plate 38 to enhance the pump-out of fluid 56 from the pumping chamber 54 through the orifices 58. Each assembly 86 includes a spring 88 and a wiper 90.

The spring 88 is a thin, longitudinal member constructed from steel or other suitable material and is mounted to a front surface 92, i.e. the surface in communication with the reservoir 60, of the pump plate 38. A first end 94 of the spring is secured to the front surface 92 outbound of the control arm 62 by any suitable means. In the embodiment illustrated in the figures, the first end 94 is spot welded at 96. Other securing means, such as a fastener, can be utilized to secure the first end 94. A second end 98 of the spring 88 terminates adjacent a respective orifice 58.

A wiper 90 is constructed from a low friction material, preferably a fiberglass filled polytetrafluoroethylene resin, suitable for contacting the clutch plate 42. The wiper 90 is connected to the second end 98 by any suitable manner, e.g. a fastener 102. While the wiper 90 illustrated in the figures is a solid cylinder, other configurations and shapes are within the scope of the invention.

The wiper 90 is inserted in an opening 104 in the pump plate 38. The diameter of the opening 104 is slightly greater than the diameter of wiper 90, thereby permitting the wiper 90 to freely slide in the opening 104. Preferably, the diameter of the opening 104 is not great enough to permit the passage of fluid 54 between the wiper 90 and the opening 108. If desired, a guiding flange 106 may encircle the opening 104 and protrude from a rear surface 108, i.e. the surface in communication with the pumping chamber 54, into the pumping chamber 54. The flange 106 acts as a guide wall as the wiper 90 slides in the opening 104. The length L of the wiper 90 is greater than the distance D between the rear surface 108 and the clutch plate 42 as described below.

In the manufacturing process, each floating wiper assembly 86 is mounted on the pump plate 38 as described above. During assembly of the clutch assembly 10, pump plate 38 is mounted on the shoulder 39 of the main body 16. The spring 88 urges the wiper 90 through the pumping chamber 54 and into full-time contact with the clutch plate 42.

Since the length L of the wiper 90 is greater than the distance D between the clutch plate 42 and the rear surface 108, the wiper 90 contacts the clutch plate 42. The spring 88 allows the stack up tolerances in the clutch assembly 10 to be greater than in conventional clutches, thereby reducing machining and assembly costs. The tolerances can be increased to a sum equal to the length L of the wiper 90 minus the thickness T of the pump plate 38 ($D=L-T$). Therefore, the machining and stack-up variances for the assembly 10 prevent the contact of the wiper 90 on the clutch plate 42 only when D exceeds $L-T$. The floating feature of the wiper 90 in the opening 104 assures contact of the clutch plate 42 by the wiper 90 when machining and assembly variances are present in the assembly 10. An advantage of this construction is a reduction of machining and assembly costs since the machining and assembly tolerances do not have to be as closely controlled as in conventional designs.

In operation, the floating wiper assembly 86 enhances the pump-out of fluid 54 in the pumping chamber 54. The wiper 90 projects into the pumping chamber 54 and creates an increase in fluid pressure, thereby forcing fluid 54 through the orifice 58 in a manner well-known in this art. The low friction material of the wipers 90 minimizes drag on the clutch plate 42 by the floating wiper assemblies 86. The present wiper 90 provides improved pump-out over conventional wipers since the wiper 90 projects the entire distance D of the pumping chamber 54 and engages the clutch plate 42.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. A wiper assembly mounted on a pump plate of a viscous fluid fan clutch, wherein the pump plate separates a pumping chamber and a reservoir and is laterally spaced from a driven clutch plate, the wiper assembly comprising:
    (a) a wiper, formed from a low friction material, having a length greater than the sum of the distance between the pump plate and the clutch plate and the thickness of the pump plate;
    (b) an opening in the pump plate complementary to the periphery of the wiper; and
    (c) spring means, secured at a first end to the pump plate and connected at a second end to the wiper, for urging the wiper through the opening into full-time contact with the clutch plate.

2. The wiper assembly as specified in claim 1 wherein the low friction material comprises a fiberglass filled polytetrafluoroethylene resin.

3. A viscous fluid clutch assembly comprising:
    (a) an input shaft adapted to be rotatably driven;
    (b) a clutch plate, rotatably driven by the input shaft, having a plurality of axially extending and concentric lands forming grooves therebetween;
    (c) a body, rotatably mounted on the input shaft, having a plurality of axially extending and concentric lands forming grooves therebetween, the body lands and grooves mated with the clutch plate lands and grooves to form a shear zone;
    (d) axial flow passages in the lands and grooves of the clutch plate to permit the flow of fluid from a reservoir to the shear zone;
    (e) a pump plate mounted on the body and laterally spaced from the clutch plate for separating the reservoir from a pumping chamber, the pumping chamber, receiving fluid exiting from the shear zone;
    (f) orifice means provided in the pump plate for permitting the return of fluid from the pumping chamber to the reservoir; and
    (g) a wiper assembly mounted on the pump plate including,
        (i) a wiper having a length greater than the sum of the distance between the pump plate and the clutch plate and the thickness of the pump plate, and
        (ii) spring means, secured at a first end to a surface of the pump plate in communication with the reservoir and connected at a second end to the wiper, for urging the wiper through a complementary opening in the pump plate into full-time contact with the clutch plate to increase fluid pressure in the pumping chamber.

* * * * *